United States Patent [19]

Torii et al.

[11] Patent Number: 5,214,362
[45] Date of Patent: May 25, 1993

[54] METHOD FOR DETECTING A COLLISION AND STOPPING DRIVE OF A MACHINE DRIVEN BY SERVOMOTORS

[75] Inventors: Nobutoshi Torii, Tokyo; Yasuo Naito, Yamanashi; Masayuki Hamura, Yamanashi; Kazuhisa Otsuka, Yamanashi, all of Japan

[73] Assignee: Fanuc Limited, Japan

[21] Appl. No.: 477,871

[22] PCT Filed: Aug. 11, 1989

[86] PCT No.: PCT/JP89/00821

§ 371 Date: Apr. 11, 1990

§ 102(e) Date: Apr. 11, 1990

[87] PCT Pub. No.: WO90/01732

PCT Pub. Date: Feb. 22, 1990

[30] Foreign Application Priority Data

Aug. 11, 1988 [JP] Japan .................. 63-198823
Dec. 28, 1988 [JP] Japan .................. 63-328866

[51] Int. Cl.$^5$ ............................................. G05B 19/10
[52] U.S. Cl. .................................... 318/567; 210/563; 210/600; 210/565; 210/566; 318/625; 318/561
[58] Field of Search ............. 318/565, 566, 635, 563, 318/625, 567, 561, 600

[56] References Cited

U.S. PATENT DOCUMENTS

| | | | |
|---|---|---|---|
| 4,375,611 | 3/1983 | Greig | 318/626 |
| 4,580,085 | 4/1986 | Eto et al. | 318/565 |
| 4,582,438 | 4/1986 | Okabayashi et al. | 400/144.2 |
| 4,594,538 | 6/1986 | Schmitt | 318/565 |
| 4,599,698 | 7/1986 | Fischer et al. | 364/551 |
| 4,682,089 | 7/1987 | Tamari | 318/568 |
| 4,695,941 | 9/1987 | Kumar | |
| 4,712,052 | 12/1987 | Omae et al. | 318/625 |
| 4,733,149 | 3/1988 | Culberson | 318/561 |
| 4,794,309 | 12/1988 | Saito et al. | 318/466 |
| 4,882,528 | 11/1989 | Sogabe et al. | 318/600 |
| 4,904,999 | 2/1990 | Klansnic et al. | 340/945 |
| 4,973,895 | 11/1990 | Torii et al. | 318/567 |

Primary Examiner—William M. Shoop, Jr.
Assistant Examiner—Karen Masih
Attorney, Agent, or Firm—Staas & Halsey

[57] ABSTRACT

A collision detection/drive stoppage method capable of promptly detecting a collision of machine operating parts driven by servomotors with a foreign object, and of promptly stopping drive of the machine operating parts upon detection of a collision, thereby preventing or lessening damage to a machine, etc., caused by the collision. A digital signal processor of an axis controller, forming a software servo system, periodically calculates a velocity deviation ($\epsilon v$) in accordance with a command velocity (Vc) calculated based on a command from a main computer and an actual motor velocity (V) from a pulse coder of the servomotor (S2), determines whether the absolute value ($|\epsilon v - \epsilon v'|$) of the difference between the velocity deviation of the current servo control period and that of the previous control period is smaller than a collision discriminating reference value (ERR) (S3), and causes an alarm to be displayed and at the same time delivers a torque command having a value of zero to stop rotation of the servomotor (S8, S9) when the absolute value is larger than the reference value.

9 Claims, 7 Drawing Sheets

| I | ERR |
|---|---|
| 0 | $ERR_0$ |
| 1 | $ERR_1$ |
| 2 | $ERR_2$ |
| 3 | $ERR_3$ |
| ⋮ | ⋮ |
| N | $ERR_N$ |

Tab

METHOD FOR DETECTING A COLLISION AND STOPPING DRIVE OF A MACHINE DRIVEN BY SERVOMOTORS

TECHNICAL FIELD

The present invention relates to a method capable of promptly detecting a collision of machine operating parts driven by servomotors with a foreign object and of promptly stopping drive of the machine operating parts upon detection of a collision.

BACKGROUND ART

During operation of a machine, if a foreign object enters the working region of a machine operating part, it interferes with the machine operating part, possibly impeding normal operation or even damaging the machine. Conventionally, various methods have been employed to avoid such an inconvenience.

For example, a collision of a machine operating part with a foreign object is detected by using a touch sensor mounted to the outer surface of the machine operating part. The provision of the sensor, however, entails an increase in the cost of the machine, and it is not possible to detect a collision of the machine operating part with a foreign object occurring outside the operable region of the sensor. In those types of machines in which the machine operating parts thereof are driven by servomotors, it is known to detect a collision of a machine operating part with a foreign object by detecting an increase in the driving current for the corresponding servomotor in excess of a predetermined discrimination current value caused by the collision. However, there is a considerable period of time from the occurrence of the collision until the servomotor driving current actually reaches the discrimination value. Therefore, a delay in the collision detection is inevitable and thus the collision can bring about greater damage due to the delay. Other types of machines, e.g., industrial robots are known in which a collision discriminating process is executed by a built-in computer in accordance with a sensor output or the detected value of the servomotor driving current. Namely, in machines of this type, the collision discriminating process is executed by the computer which is used for controlling the robot; in other words, both the collision discriminating process and the robot control are carried out by the same computer. The robot control, however, involves a variety of complicated data processings, and accordingly, execution periods of the control process and the collision discriminating process of the computer become inevitably long. Consequently, time passes until the collision discriminating process is completed after an occurrence of collision, thus further increasing the delay in the collision detection.

SUMMARY OF THE INVENTION

An object of the present invention is to provide a method which is capable of promptly detecting a collision of machine operating parts driven by servomotors with a foreign object and also capable of promptly stopping drive of the machine operating parts upon detection of a collision, thereby preventing or lessening damage to a machine, etc., caused by the collision.

To achieve the above object, according to the present invention, a method of detecting a collision and stopping drive of a machine driven by a servomotor, comprises the steps of: (a) periodically detecting a value of a collision discriminating parameter associated with a driving force of the servomotor; (b) periodically detecting an amount of change in the collision discriminating parameter value; (c) determining that a collision has occurred, when the amount of change in the collision discriminating parameter value becomes larger than a discrimination reference value; and (d) controlling the servomotor such that when an occurrence of a collision is detected, rotation of the servomotor is stopped.

According to the present invention, when the amount of change in the collision discriminating parameter value becomes larger than the discrimination reference value, it is determined that a collision has occurred in the machine driven by the servomotor, and rotation of the servomotor is stopped. Therefore, the occurrence of a collision can be quickly detected without using a special sensor, and the drive of the machine can be promptly stopped, whereby damage to the machine, etc. caused by the collision can be prevented or lessened.

DESCRIPTION OF THE PREFERRED EMBODIMENTS

Figure 6:
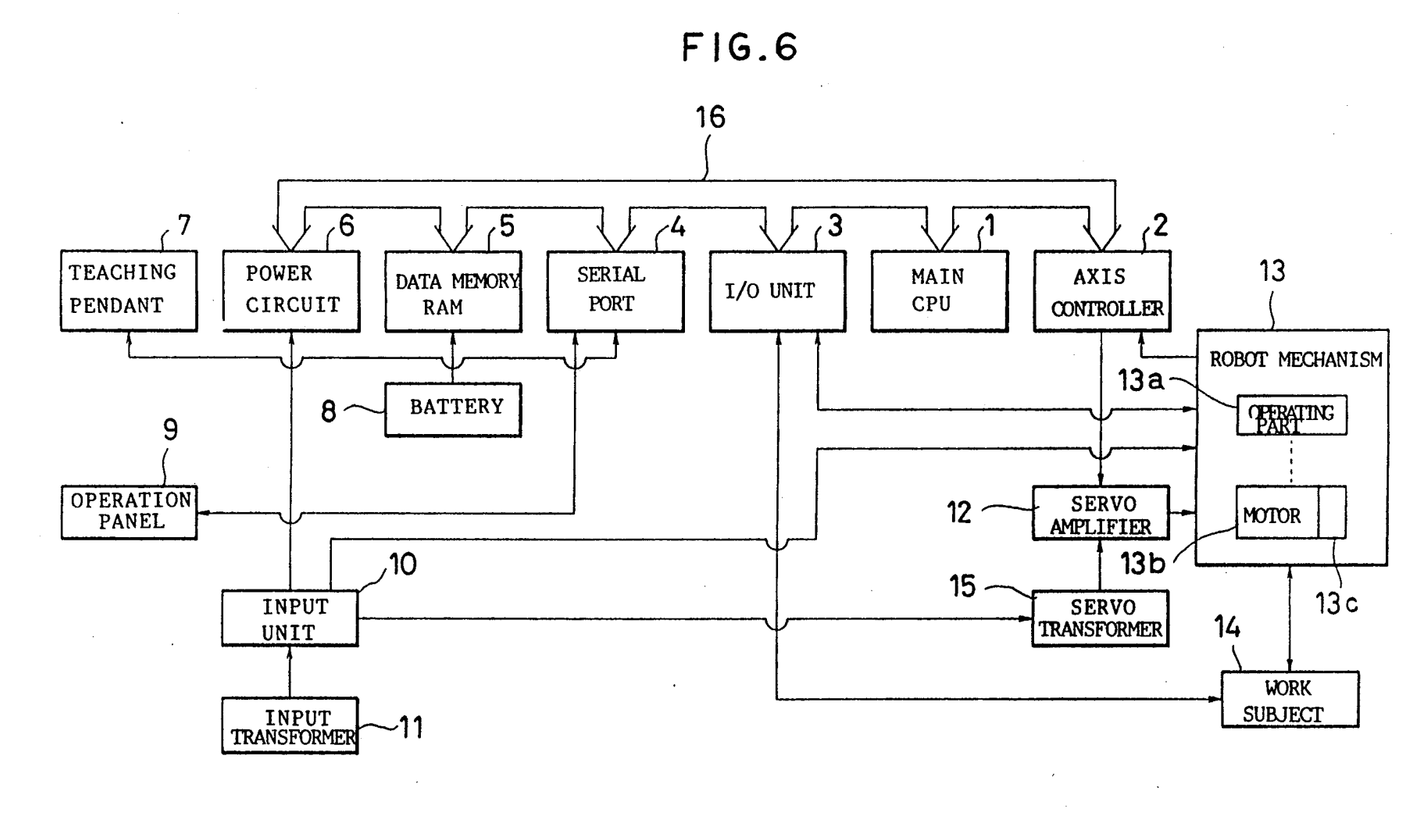
FIG. 6 is a block diagram schematically showing a principal part of an industrial robot to which the method according to the first embodiment is applied.

Referring first to FIG. 6, an industrial robot to which a method according to a first embodiment of the present invention is applied has an arrangement fundamentally similar to a conventional one, and comprises a robot mechanism 13 for carrying out predetermined tasks on a subject 14 having various sensors (not shown), a control device having various elements described hereinafter, for controlling the robot mechanism 13, and various sensors (not shown).

The robot mechanism 13 has various operating parts, such as a series of links forming an arm, and an end effector mounted to the distal end of the arm, etc. Each of the operating parts (only one is shown with numeral 13a) is moved linearly or rotated relative to one or more axes thereof by an associated actuator or actuators. The actuators each comprise a servomotor (only one is shown with numeral 13b) which is preferably provided with a velocity detector 13c.

The control device comprises a main computer 1 for controlling the robot, which includes a microprocessor, a ROM for storing a control program executed by the microprocessor, a RAM for temporarily storing data, etc., and is arranged to send an operation command such as a movement command for the individual axes of the robot.

Figure 7:
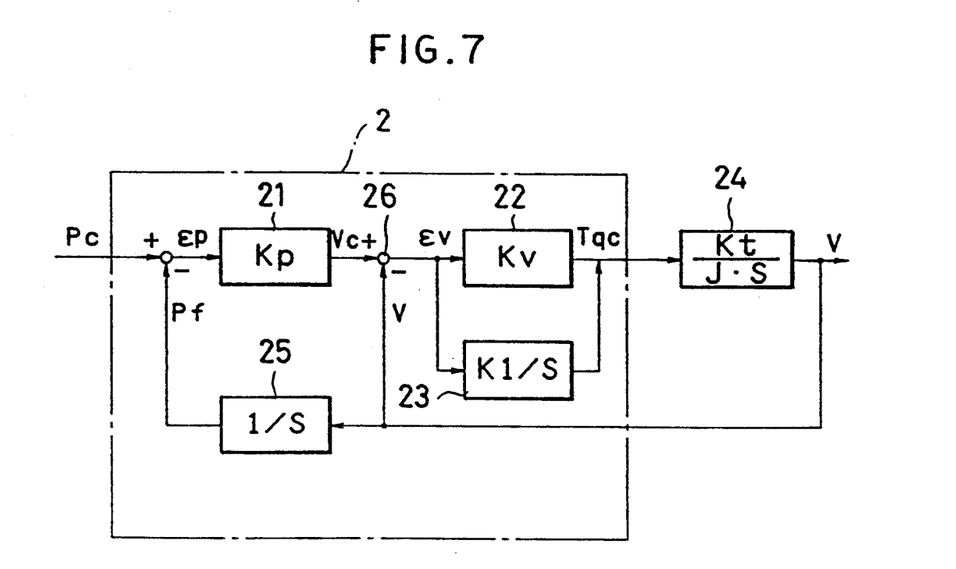
FIG. 7 is a block diagram showing, by using transfer functions, control characteristics of a servo system associated with one axis of the robot of FIG. 6.

An axis controller 2 cooperates with the servomotors of the individual axes of the robot and servo amplifiers associated therewith (one of which is illustrated with numeral 12), to constitute digital servo systems for the respective axes, i.e., software servo systems. Specifically, the axis controller 2 includes a digital signal processor (not shown) having a position control function 21, a proportional control function 22, and integral control functions 23 and 25, shown in FIG. 7. The axis controller 2 is arranged to send a torque command which varies in dependence on the movement command from the main computer 1, to a servo amplifier which cooperates with the associated servomotor to provide a control characteristic 24 shown in FIG. 7. In FIG. 7, symbols Kp, Kv and K1 respectively denote the position loop gain, proportional gain and integral gain of the axis controller 2, Kt denotes the torque constant of the servomotor, and J denotes the total inertia acting on the output shaft of the servomotor. The axis controller 2 further includes a memory (register) for storing a collision discriminating reference value ERR described hereinafter in detail, flag data F representing an operation mode of servo control of the digital signal processor, and velocity deviation data $\epsilon v'$ for the collision discrimination.

The control device further comprises an I/O unit 3 which is connected to the various sensors of the robot, the various actuators, and to the various sensors of the work subject 14; a serial port 4 connected to a teaching pendant 7 and an operation panel 9; a RAM 5 serving as a data memory and backed up by a battery 8; and a power circuit 6 to which electric power is supplied from an external power supply (not shown) through an input transformer 11 and an input unit 10. The teaching pendant 7 and the operation panel 9 are each provided with a display unit (not shown). The main computer 1 and the aforementioned elements 2-5 connected to the computer 1 are arranged to be supplied with electric power through a back panel 16, and the robot mechanism 13 is arranged to be supplied with electric power through the input unit 10. Electric power is also supplied to the servo amplifiers 12 through the input unit 10 and a servo transformer 15.

In the following, operation of the robot constructed as above will now be described with reference to FIG. 1.

Before starting operation of the robot, the control device shown in FIG. 6 is initialized and the flag data F stored in the memory of the axis controller 2 is reset to "0" (zero). Then, an operator operates the teaching pendant 7 and the operation panel 9 to effect teaching to the robot in a conventional manner, so that the teaching data is stored in the RAM 5. Further, the operator operates the operation panel 9 to store the collision discrimination reference value ERR in the memory (register) of the axis controller 2. This value ERR is set to a value larger by a predetermined value than the maximum amount of change of velocity deviation that can be produced within a period corresponding to one execution period of servo control action of the axis controller 2 when the robot is operating normally.

When the robot is in operation, the main computer 1 successively executes various control actions at intervals of a predetermined period. The control actions include, for example, a process of calculating movement commands for the individual axes of the robot in accordance with the teaching data stored in the RAM 5.

The digital signal processor of the axis controller 2 executes position control, velocity control and torque control (servo control action) of the individual axes of the robot and a collision discriminating action mentioned later, at intervals of a period which is shorter than the period of execution of the control actions by the main computer 1.

Figure 1:
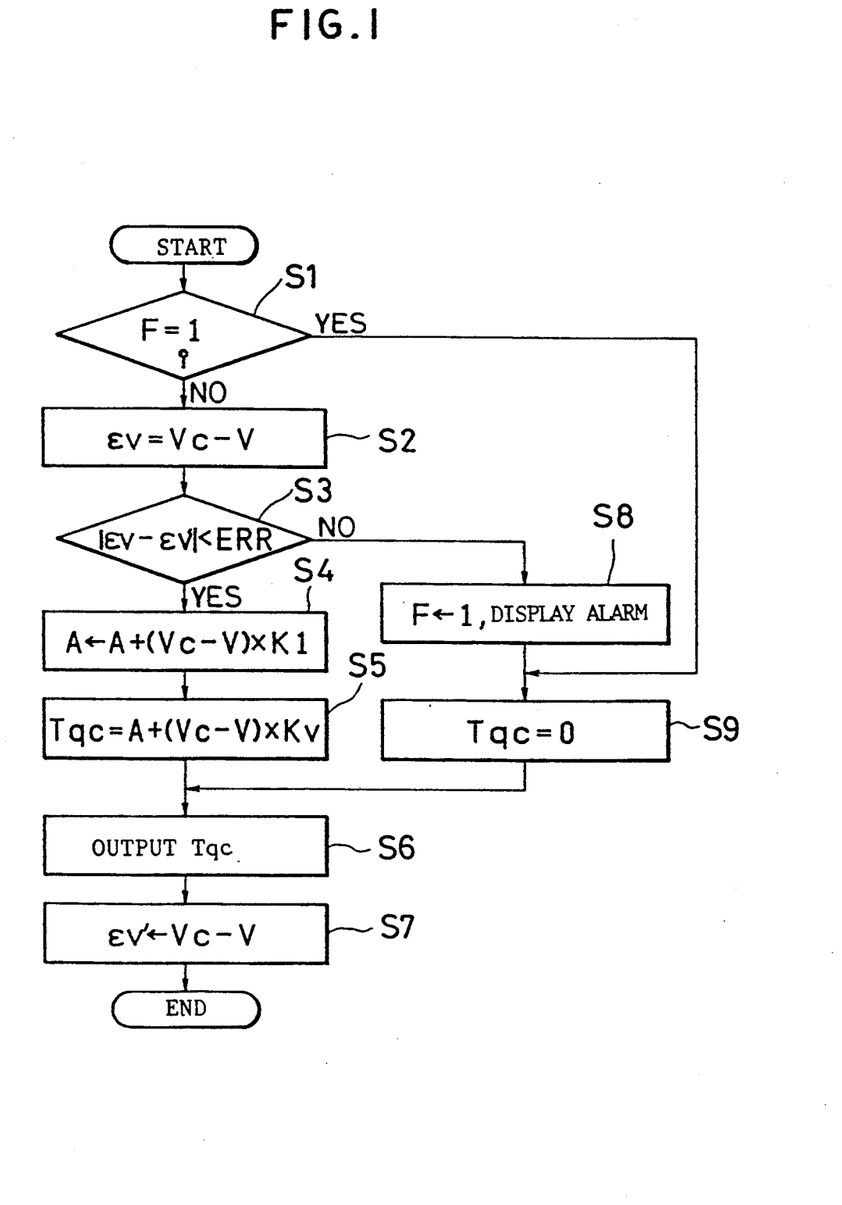
FIG. 1 is a flowchart of a control program for executing a collision detection/drive stoppage method according to a first embodiment of the present invention.

Namely, in a control period, the digital signal processor determines whether the flag F stored in the memory of the axis controller 2 has been reset to "0" (Step S1 in FIG. 1). If the flag F has been reset, then the result of the determination in Step S1 is negative (NO). Accordingly, the digital signal processor integrates (as indicated by 25 in FIG. 7) the output of a velocity detector mounted to the servomotor relating to the current execution period of control action. For example, the output of the velocity detector 13c mounted to the servomotor 13b, which output represents an actual rotation velocity V of the associated servomotor is used to calculate an actual rotational position Pf of the servomotor 13b. The processor then calculates a velocity command Vc for this servomotor in accordance with the difference (position deviation) $\epsilon p$ between a command position Pc, indicated by a command signal from the main computer 1, and the actual position Pf. Subsequently, the digital signal processor calculates the difference (velocity deviation) $\epsilon v$ between the calculated command velocity Vc and the actual motor velocity V, as indicated by reference numeral 26 in FIG. 7 (Step S2). It is then determined whether an absolute value $|\epsilon v - \epsilon v'|$ of change in the velocity deviation during a period corresponding to one control period. This change is obtained by subtracting the velocity deviation $\epsilon v'$ (described later) calculated in the previous servo control period from the value $\epsilon v$ calculated as described above to determine whether the result is smaller than the collision discriminating reference value ERR (Step S3).

If the determination result in Step S3 is affirmative, the digital signal processor determines that the robot is operating normally, and accordingly carries out a normal control action. Specifically, as indicated by reference numeral 23 in FIG. 7, the digital signal processor calculates the product of the velocity deviation $\epsilon v$ (=Vc−V) and the integral gain K1, and adds the obtained product to a value A of an accumulator (Step S4). Subsequently, as indicated by reference numeral 22 in FIG. 7, the processor calculates the product of the velocity deviation $\epsilon v$ (=Vc−V) and the proportional gain Kv, obtains a torque command value Tqc by adding the thus calculated value Kv·(Vc−V) to the value A of the accumulator, and, after D/A conversion, outputs the value Tqc to the servo amplifier 12 (Steps S5, S6).

The servo amplifier 12 causes a driving current corresponding to the torque command value Tqc to flow through the servomotor 13b, to rotate the same at the velocity V and thus drive the associated robot operating part 13a. The digital signal processor stores the deviation Vc−V between the command velocity Vc and the actual velocity V, in the register as the velocity deviation $\epsilon v'$ to be used in the collision discriminating step (S3) of the subsequent control period (Step S7), and ends the process for the current control period. Thereafter, the aforementioned process is repeated at intervals of the predetermined control period.

During operation of the robot according to the above-described servo control, if the robot operating part 13a collides, for example, with a foreign object which has entered the work region of the operating part, the actual rotational velocity V of the servomotor 13b is decreased or even the rotation of the servomotor is stopped. In such a case, the velocity deviation $\epsilon v$ ($=Vc-V$) calculated in Step 2 during the servo control period immediately after the occurrence of the collision is abruptly increased. Accordingly, in Step 3 of the same control period, it is determined that the absolute value $|\epsilon v - \epsilon v'|$ of change in the velocity deviation during the period from the time point of the previous collision discrimination to the time point of the current collision discrimination is larger than the collision discriminating reference value ERR. In this case, the digital signal processor determines that a collision has occurred, and accordingly, sets the flag F to "1" and displays a message indicating the occurrence of the collision at the display unit of the operation panel 9, for example (Step S8). Subsequently, the torque command value Tqc is set to "0" (Step S9), and execution continues in Step S6. As a result, a torque command having a value of "0" is sent to the servo amplifier 12 from the axis controller 2 so that no driving current flows through the servomotor 13b and thus the motor rotation is stopped. The digital signal processor then executes Step S7 to store the aforesaid velocity deviation, and ends the process of the current control period.

Since the flag F is set to "1" in Step S8 of the current control period, a process including a series of Steps S1, S9, S6 and S7 is repeatedly executed in the next and subsequent control periods, whereby the motor stoppage is maintained.

So far, the operation relating to only one control axis of the robot has been described, but the above equally applies to the other axes.

Now, a collision detection/drive stoppage method according to a second embodiment of the invention will be described with reference to FIG. 2.

As distinct from the method of the first embodiment in which the collision detection is based on the amount of change in the velocity deviation, according to the method of the second embodiment, the collision detection is carried out based on the amount of change in the torque command. The method of this embodiment and those according to embodiments described hereinafter are applied, for example, to the robot shown in FIG. 6.

During normal operation of the robot, the digital signal processor of the axis controller 2 determines that the value of the flag F is not equal to "1", in Step S100 in each of the servo control periods, and obtains the velocity deviation $\epsilon v$ ($=Vc-V$) by a process similar to that of Step S2 in FIG. 1. The processor then executes torque command value calculation steps S101 and S102 corresponding to Steps S4 and S5, respectively. Subsequently, the digital signal processor obtains an amount of change in the torque command value by subtracting the torque command value Tqc' of the previous servo control period from the thus obtained torque command value Tqc, and determines whether the absolute value thereof, i.e., $|Tqc - Tqc'|$, is smaller than the collision discriminating reference value ERR (Step S103). This value ERR is set to a value larger by a predetermined value than the maximum amount of change of torque command that can be produced within a period corresponding to one servo control period when the robot is operating normally, and is previously stored in the register of the axis controller 2 before operation of the robot is started. If the determination result in Step S103 is affirmative, the digital signal processor determines that the robot is operating normally, and, after executing the torque command value calculation step S106 corresponding to Step S6, stores the value Tqc calculated in Step S102, in the register as the value Tqc' for use in the collision discrimination process (S103) of the subsequent control period (Step S107), followed by termination of the process of the current control period.

During operation of the robot, if the robot operating part 13a collides with a foreign object, the actual rotational velocity V of the servomotor 13b drops or even the rotation of the servomotor stops. In such a case, the velocity deviation $\epsilon v$ ($=Vc-V$) calculated during the control period immediately after the occurrence of the collision abruptly increases and accordingly, the torque command value Tqc calculated in Step S102 of the same control period abruptly increases. Consequently, the determination in the collision discriminating step S103 becomes negative (NO). The digital signal processor then executes Steps S104 and S105 corresponding to Steps S8 and S9, respectively, to give warning of the occurrence of a collision and stop the rotation of the servomotor. The stoppage of the motor is maintained in the next and the following control periods.

Next, a collision detection/drive stoppage method according to a third embodiment of the invention will be described with reference to FIGS. 3 and 8.

The third embodiment is fundamentally similar to the first embodiment, but differs therefrom in that the collision discriminating reference value is varied in accordance with the command velocity. Also, a torque command value proportional to the actual motor velocity and acting on the motor to rotate it in a direction opposite to the actual rotational direction is delivered to servo amplifier 13b when a collision occurs.

To this end, the memory of the axis controller 2 is provided with a look-up table Tab for storing collision discriminating reference values respectively corresponding to N+1 command velocity ranges. As shown in FIG. 8, the table Tab has N+1 addresses I ($=0, 1, \ldots, N$), the zero-th address corresponding to the zero-th command velocity range of which the command velocity Vc is "0", and at which address a collision discriminating reference value ERR0 is stored. The value ERR0 is used to detect a collision when the drive of the servomotor is started. The i-th address ($i=1, 2, \ldots, N$) corresponds to the i-th velocity range, the absolute value of the command velocity Vc of which is larger than $(i-1)\cdot Vcmax/N$ and is equal to or smaller than $i\cdot Vcmax/N$, and a reference value ERRi is stored at this address; here, Vcmax represents the maximum command velocity, and N represents the integral number smaller than the command velocity range number by "1". The value ERRi is set to such a value that the relationship $ERRi < ERR_{i+1}$ is fulfilled, and accordingly permits a wider variation in the velocity deviation as the command velocity increases. In other words, taking account of the fact that the amount of drop in the rotation velocity of the motor becomes larger with an increase in the motor rotation velocity at collision, the reference value is set such that the occurrence of a collision can be detected as early as possible while avoiding an erroneous collision detection.

Figure 3:
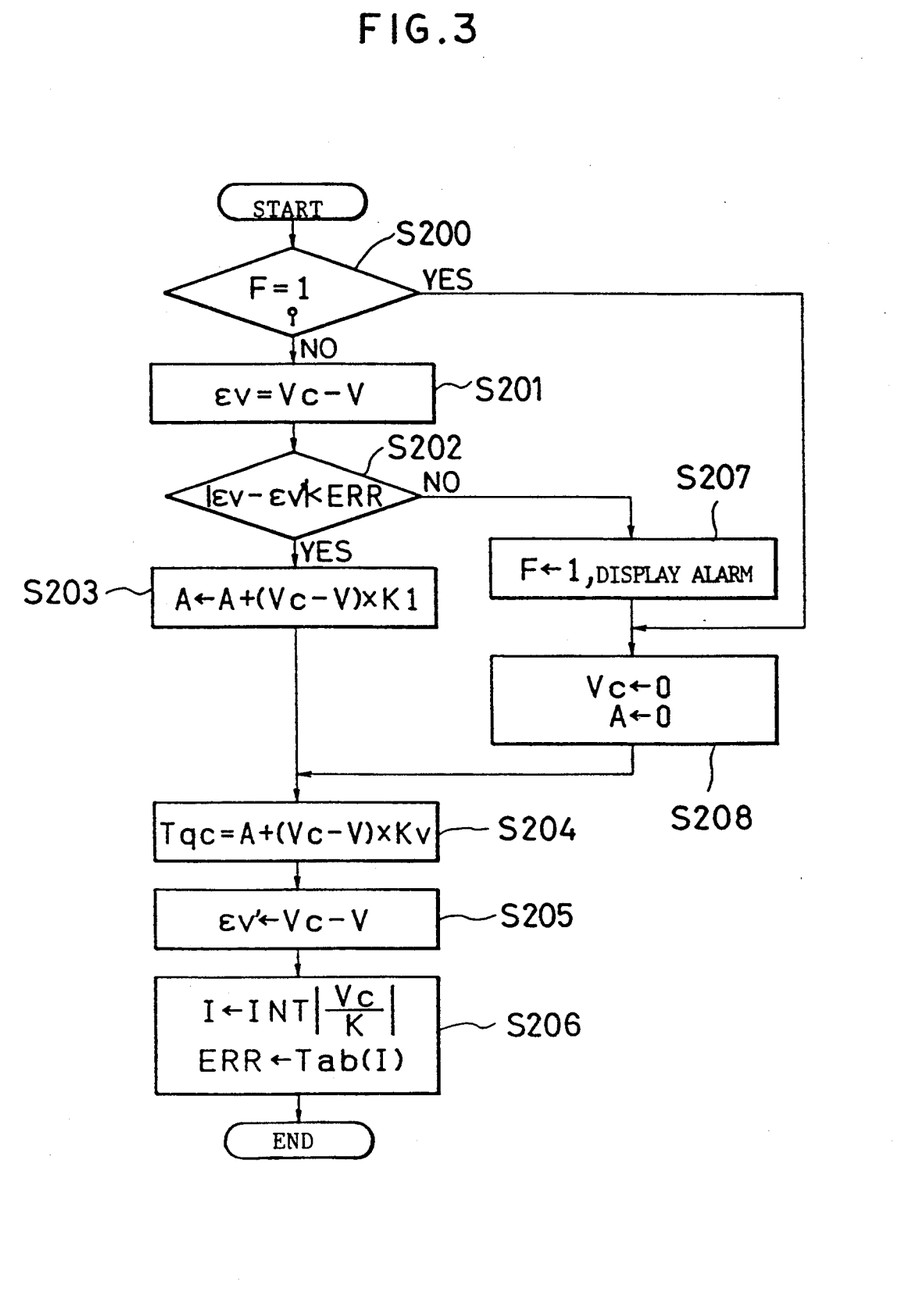
FIG. 3 is a flowchart similar to FIG. 1 according to a third embodiment of the invention.

Referring to FIG. 3, during operation of the robot, the digital signal processor of the axis controller 2 successively executes Steps S200 to S204 corresponding to Steps S1 to S5 of FIG. 1 and relating to the collision discrimination, calculation of the torque command value, etc., and sends the resultant torque command value Tqc to the servo amplifier 12. Then, after executing the velocity deviation storage step S205 corresponding to Step S7, the digital signal processor determines to which of the N+1 command velocity ranges the command velocity Vc belongs (Step S206). Namely, the digital signal processor obtains a value Vc/K by dividing the command velocity Vc by an arithmetic constant K (=Vcmax/N), raises the fractions of the first and lower decimal places of the calculated value Vc/K to a whole number to thereby obtain a value Vc/K expressed as an integral number, and obtains an absolute value thereof (hereinafter referred to as INT|Vc/K|). The value INT|Vc/K| indicates an address I (0, 1, ..., N) of the look-up table corresponding to the command velocity range to which the command velocity Vc belongs. Namely, the following equation (1) is fulfilled:

$$I = INT|Vc/K| \tag{1}$$

Subsequently, the digital signal processor reads the required collision discriminating reference value ERRi (i=0, 1, ..., N) from the Ith address of the look-up table Tab, and stores this reference value in a predetermined register of the axis controller 2 (Step S206).

If, during operation of the robot, the determination in the collision discrimination step S202 becomes NO, the digital signal processor sets the flag F to "1" and displays an alarm in Step S207 which corresponds to Step S8. The collision discriminating reference value ERR used in Step S202 corresponds to the maximum allowable amount of decrease in the motor velocity which varies in accordance with the command velocity, as described above, whereby the collision detection can be reliably and quickly carried out. Then, in Step S208, the command velocity value Vc and the value A of the accumulator A are set to "0", and Step S204 is entered to calculate the torque command Tqc. The calculated torque command Tqc can be expressed by the following equation (2):

$$Tqc = -V \cdot Kv \text{(when } A=0; Vc=0\text{)} \tag{2}$$

Next, the digital signal processor executes the aforementioned Steps S205 and S206 for storing the velocity deviation and selecting the collision discriminating reference value, and ends the process for the current control period. In the subsequent control periods. The processor delivers the torque command value Tqc given by the equation (2). In this manner, after the detection of a collision, the torque command value proportional to the actual velocity V of the servomotor and acting on the servomotor to rotate it in a direction opposite to the actual rotational direction is delivered to the servo amplifier 12. Accordingly, the servomotor 13b is quickly and smoothly braked, and thus the rotation thereof is stopped in a short time, thereby stopping the drive of the robot operating part 13a. The torque command value Tqc is gradually decreased with a decrease in the actual motor velocity after the occurrence of the collision.

Now, a collision detection/drive stoppage method according to a fourth embodiment will be described with reference to FIG. 4.

The fourth embodiment is fundamentally similar to the second embodiment, but differs therefrom in that the collision discriminating reference value is varied in accordance with the command velocity. Moreover, a torque command having a value proportional to the actual motor velocity and acting on the motor to rotate it in a direction opposite to the actual rotational direction is delivered to servo amplifier 12 when a collision occurs. The fourth embodiment thus is similar to the third embodiment in these respects. To this end, a table (not shown) similar to the look-up table Tab shown in FIG. 8 is used, which table stores collision discriminating reference values corresponding to N+1 command velocity ranges, respectively, such that the collision discriminating reference value is increased with an increase in the command velocity. The collision discriminating reference value used in this embodiment, however, represents an allowable amount of change in the torque command during a period corresponding to one control period, and accordingly differs in magnitude from the collision discriminating reference value in FIG. 8 representing the allowable amount of change in the velocity deviation.

Figure 2:
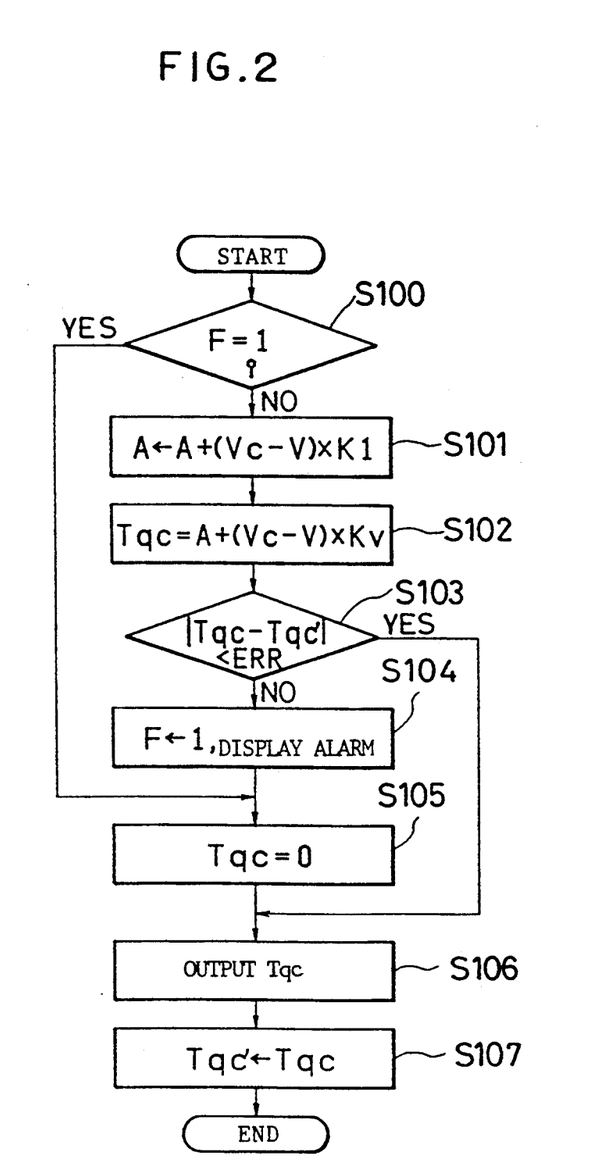
FIG. 2 is a flowchart similar to FIG. 1 according to a second embodiment of the invention.
Figure 4:
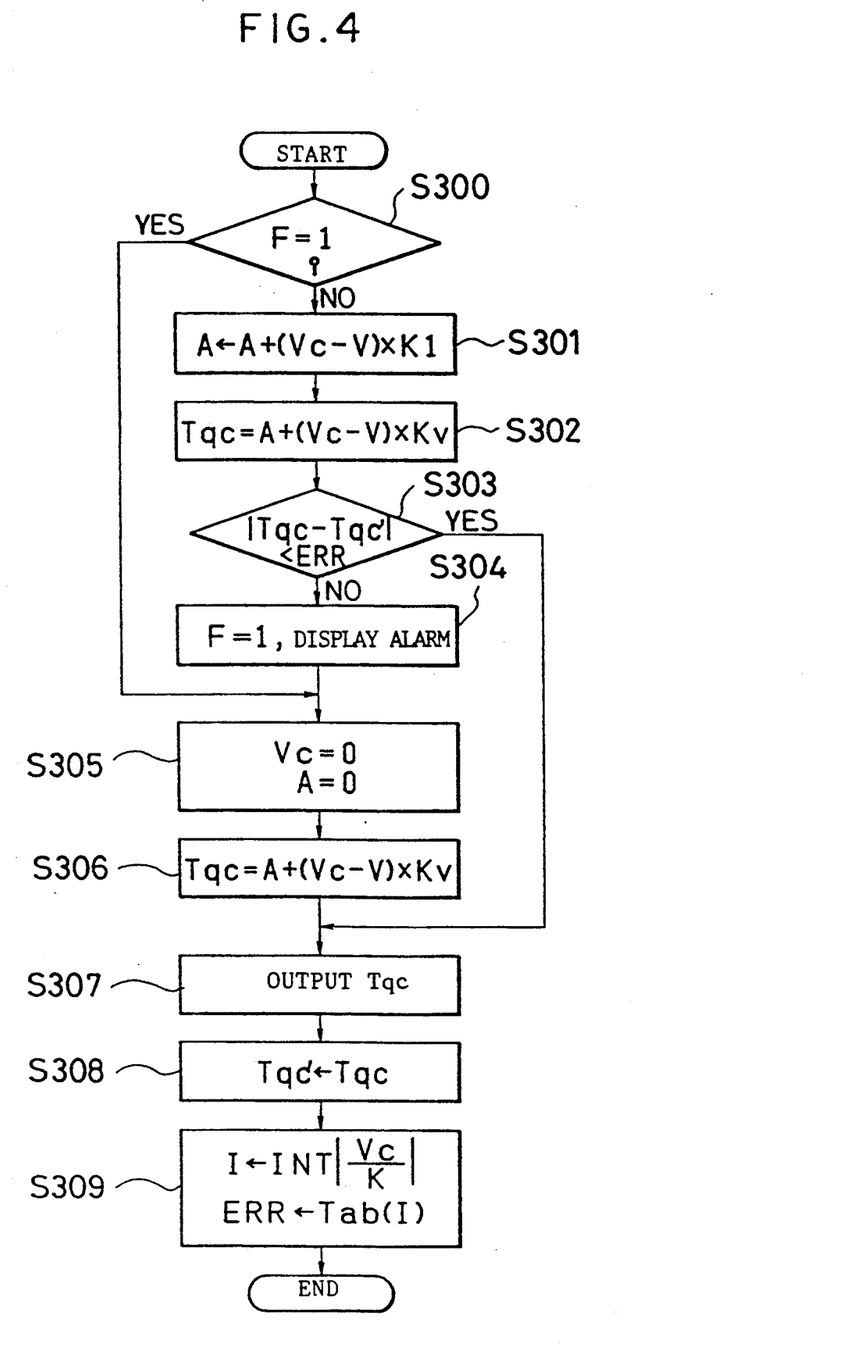
FIG. 4 is a flowchart similar to FIG. 1 according to a fourth embodiment of the invention.

Referring to FIG. 4, during normal operation of the robot, the digital signal processor sequentially executes Steps S300 to S303, S307 and S308 for the confirmation of operation mode of the processor, calculation of the torque command value, collision discrimination and storage of the torque command value, corresponding to Steps S100 to S103, S106 and S107 in FIG. 2, and then Step S309 for the selection of the collision discriminating reference value, corresponding to Step S206 in FIG. 3, in the order mentioned.

If a collision occurs during an operation of the robot, the determination in the collision discrimination step S303 corresponding to Step S103 in FIG. 2 becomes negative (NO), and accordingly, the digital signal processor executes Step S304 for the switching of the processor operation mode and alarm display, corresponding to Step S104 in FIG. 2, Steps S305 and S306 for the calculation of the torque command value at collision, corresponding to Steps S208 and S204 in FIG. 3, respectively, and then the aforementioned Steps S307 to S309. Accordingly, similar to the case of the third embodiment, the servomotor 13b is quickly braked after the collision detection, in accordance with the torque command value Tqc which is proportional to the actual servomotor velocity V and acts on the servomotor to rotate it in a direction opposite to the actual rotational direction.

Figure 5:
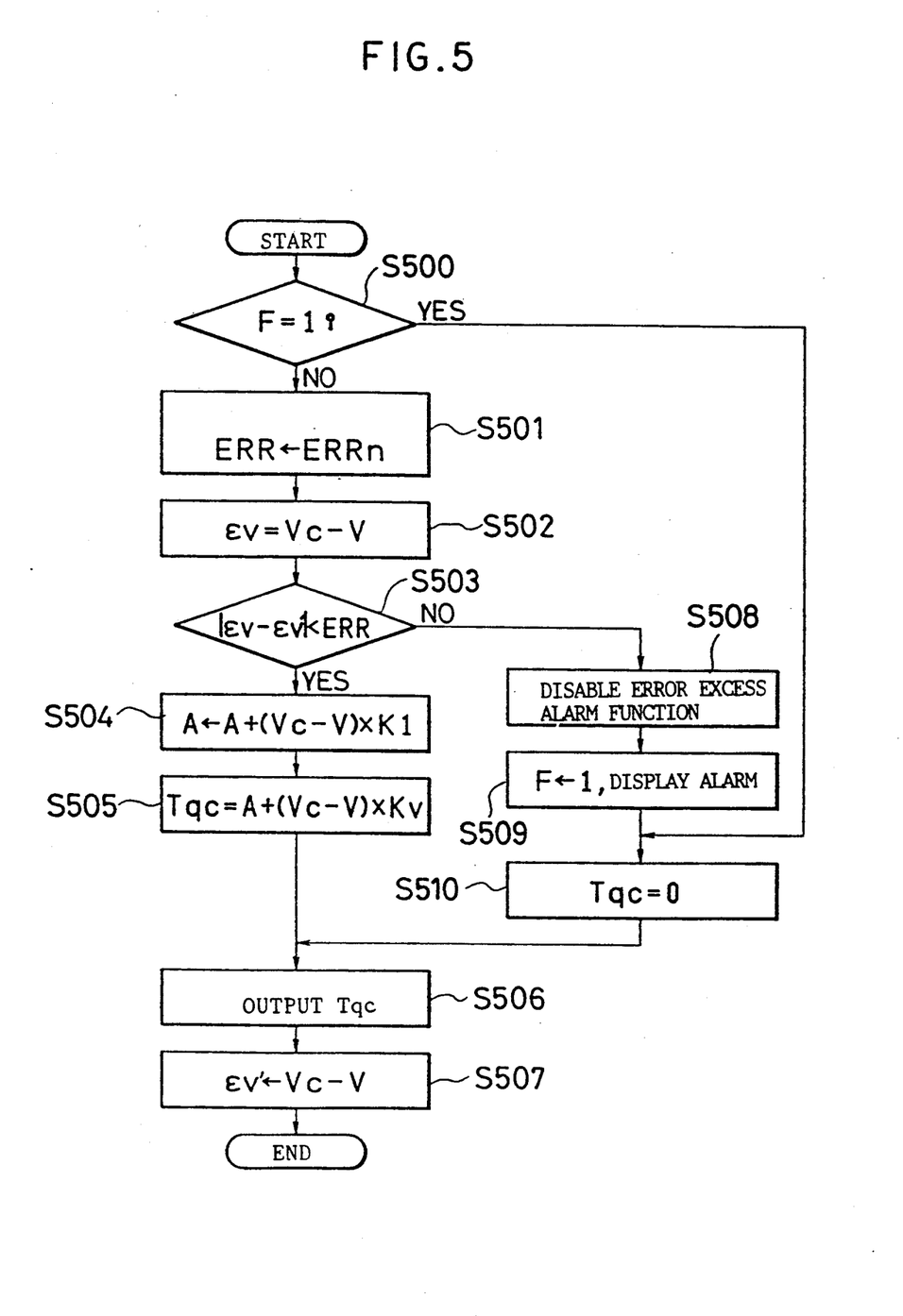
FIG. 5 is a flowchart similar to FIG. 1 according to a fifth embodiment of the invention.

Next, a collision detection/drive stoppage method according to a fifth embodiment will be described with reference to FIG. 5.

The fifth embodiment is fundamentally similar to the first embodiment, but differs therefrom in that the collision discriminating reference value is varied in accordance with the type of an operation command read from a program by the control device of FIG. 6, and that an error excess alarm function of the control device of FIG. 6 is disabled when a collision occurs.

Figure 8:
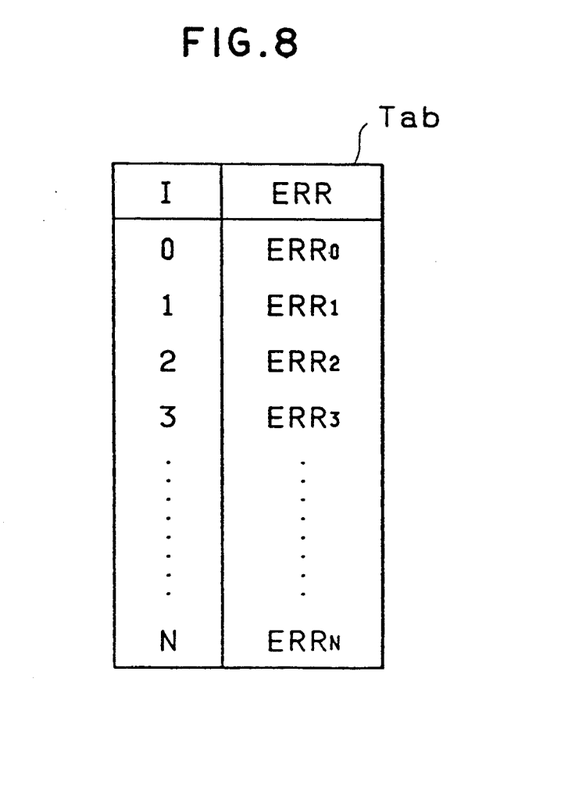
FIG. 8 is a diagram showing a look-up table for storing collision discriminating reference values, used in the method according to the third embodiment.

To this end, the fifth embodiment employs a look-up table (not shown) similar to the table Tab of FIG. 8, which stores a desired number of collision discriminating reference values. The collision discriminating reference values are set corresponding to the types of operation commands. For example, G01 code represent linear interpolation, G02 code represent circular interpolation, etc., to provide a collision discrimination best suited to the operating condition of the machine operating part which condition varies in accordance with the type of the operation command being executed. Further, according to this embodiment, the error excess alarm function is disabled upon detection of a collision, for the following reason: The error excess alarm function for deenergizing the servomotor when a position deviation (the difference between a command position and an actual position), which is a control parameter in the servo control system, is too large may be effected when a collision occurs wherein the position deviation is increased. In such a case, the servomotor can no longer be operated under the control of the axis controller 2, and therefore, the error excess alarm function may obstruct the execution of the method of the invention in which the rotation of the servomotor should be stopped after the detection of a collision.

Operation of the robot to which the fifth embodiment is applied is substantially the same as that of the first or third embodiment. During normal operation of the robot, Steps S500 and S502 to S507 corresponding respectively to Steps S1 to S7 in FIG. 1 are executed. The fifth embodiment differs from the first or third embodiment in that the collision discriminating reference value ERR corresponding to the type of operation command associated with the current control period is read from the memory in Step S501 preceding the collision discrimination step S503. When a collision occurs, the error excess alarm function of the robot control device is disabled in Step S508, so that the servomotor can be operated under the control of the axis controller 2 even after the occurrence of the collision. Immediately after the occurrence of a collision, Steps S509, S510, S506 and S507 corresponding to Steps S8, S9, S6 and S7 in FIG. 1, respectively, are executed, and thereafter Steps S500, S510, S506 and S507 corresponding respectively to Steps S1, S9, S6 and S7 are executed.

The present invention is not limited to the first to fifth embodiments described above, but is applicable to various machines other than robots and various modifications are possible. For instance, the above embodiments describe specific combinations of the collision discriminating parameter (velocity deviation or torque command value), the collision discriminating reference value (which is fixed, or varied in accordance with the command velocity or the type of operation command), the torque command value ("0" or "−Kv") delivered after the detection of a collision, and the process of disabling the error excess alarm function, other combinations of these are possible. For example, the process of disabling the error excess alarm function, described in the fifth embodiment, may be applied to the first to fourth embodiments. Further, in the second embodiment, the collision discriminating reference value may be varied in accordance with the type of operation command, as in the fifth embodiment.

In the third and fourth embodiments, the collision discriminating reference value is obtained from the look-up table in accordance with the command velocity, but a required collision discriminating reference value may be calculated by the use of a formula which is experimentally determined beforehand and represented as a function of the command velocity. Furthermore, although the foregoing embodiments use the collision discriminating reference value which is fixed or variable in accordance with the command velocity or the type of operation command, the collision discriminating reference value may alternatively be varied in accordance with the operated position of the machine operating part. In this case, for example, a required number of collision discriminating reference values may be stored in a look-up table, corresponding to sequence numbers which represent a series of blocks in a control program of various machines and thus indicate operating position regions.

Moreover, the product of the maximum amount of change in the velocity deviation or torque command value during a period corresponding to one servo control period and the safety coefficient may be used as the collision discriminating reference value. In this case, based on the velocity deviations or torque command values periodically detected while the machine is operating normally, the amount of change in the velocity deviation or torque command value between the previous and current detection periods is sequentially calculated and stored in individual detection periods, and the maximum amount of the change is obtained after the machine operation is ended. In doing this, the maximum amount of change may be obtained for respective types of operation commands or for respective operating position regions of the machine operating part.

Further, the sum of the absolute value of the difference between the previous velocity deviation $\epsilon v'$ and the current velocity deviation $\epsilon v$ or of the difference between the previous torque command value $Tqc'$ and the current torque command value $Tqc$ and a predetermined value B, namely, $|\epsilon v - \epsilon v'| + B$ or $|Tqc - Tqc'| + B$, may be calculated in each servo control execution period, and the sum obtained may be used as the collision discriminating reference value for the subsequent control period.

In the fourth embodiment, the torque command value $Tqc$ is obtained in accordance with the formula $Tqc = A + (Vc - V) \cdot Kv$ in an operation routine, and in line therewith, the torque command value after the detection of a collision is obtained by substituting zero for the terms $Vc$ and $A$ in the formula. Alternatively, the command value $Tqc$ after the collision detection may be calculated in accordance with the formula $Tqc = -V \cdot Kv$.

According to the present invention, the following advantages are achieved.

(i) Since the occurrence of a collision is detected in each of the execution periods of servo control action of the digital signal processor, a collision can be detected in the servo control period immediately after the occurrence of the collision. Accordingly, the delay in the collision detection is equal at the longest to one execution period of servo control action of the digital signal processor. Therefore, a collision can be detected more quickly than in the case of detecting a collision by using the main computer of the control device installed in various machines.

(ii) The torque command having the value "0" or the torque command having a value proportional to the actual motor velocity after the occurrence of a collision and acting on the motor to rotate it in a direction opposite to the actual rotational direction is delivered upon and after detecting the occurrence of a collision. Accordingly, the motor rotation can be quickly and smoothly stopped upon occurrence of a collision and damage to various machine parts caused by the collision can be minimized.

(iii) The collision discriminating reference value is so set as to be variable in accordance with the command velocity, the type of operation of the machine operating part, etc. Therefore, the occurrence of a collision can be quickly detected regardless of operating condition of various machines, and erroneous detection can be eliminated.

We claim:

1. A method for detecting a collision and for stopping a machine driven by a servomotor providing a driving force, comprising the steps of:
   (a) periodically detecting a collision parameter of the driving force of the servomotor, said collision parameter corresponding to one of a deviation between a command velocity delivered to the servomotor and an actual rotational velocity of the servomotor, and a deviation between successive torque command values delivered to the servomotor;
   (b) periodically detecting an amount of change in the collision parameter;
   (c) determining if a collision has occurred, when the detected amount of change in the collision parameter becomes larger than first reference value; and
   (d) stopping rotation of the servomotor when occurrence of a collision is so determined.

2. A method according to claim 1, wherein the machine includes a main computer, having an execution period for control actions, and wherein steps (a) and (b) are executed at constant detection periods that are shorter than the execution period of the control actions of the main computer, and said detecting in step (b) comprises the substep of:
   determining a deviation between a first value of the collision parameter detected in a first detection period and a second value of the collision parameter detected in a second detection period.

3. A method according to claim 1, wherein step (d) comprises the sub-step of:
   providing a torque command value having a value of zero to the servomotor.

4. A method according to claim 1, wherein said stopping in step (d) comprises the sub-step of:
   delivering a torque command having a magnitude proportional to an actual rotational velocity of the servomotor and an indicated direction opposite to an actual rotational direction of the servomotor.

5. A method according to claim 1, further comprising the step of:
   (e) determining the first reference value in accordance with a command velocity.

6. A method according to claim 1, further comprising the step of:
   (e) determining the first reference value in dependence upon inputted operation commands.

7. A method according to claim 1, further comprising the steps of:
   (e) providing an error excess alarm for deenergizing the servomotor when a position deviation in the machine exceeds a second reference value, and
   (f) disabling the error excess alarm when a collision is detected in step (c).

8. A method according to claim 1, further comprises the steps of:
   (e) periodically detecting a value of the collision parameter while the servomotor is operating normally;
   (f) repeatedly calculating and storing an amount of change between respective collision parameter values; and
   (g) selecting a maximum one of the calculated amounts of change of the collision parameter values as the reference value.

9. A method according to claim 1, wherein step (c) includes the sub-step of (c1) periodically determining whether the amount of change in the collision parameter value is larger than the first reference value, and wherein said method further comprises the step of:
   (e) calculating a sum of the collision parameter values detected in step (a), the calculated sum being used as the first reference value in step (c1).

* * * * *